Aug. 25, 1942.  C. T. SLOAN  2,293,860
METHOD OF FEEDING GLASS
Filed March 8, 1940  4 Sheets-Sheet 1
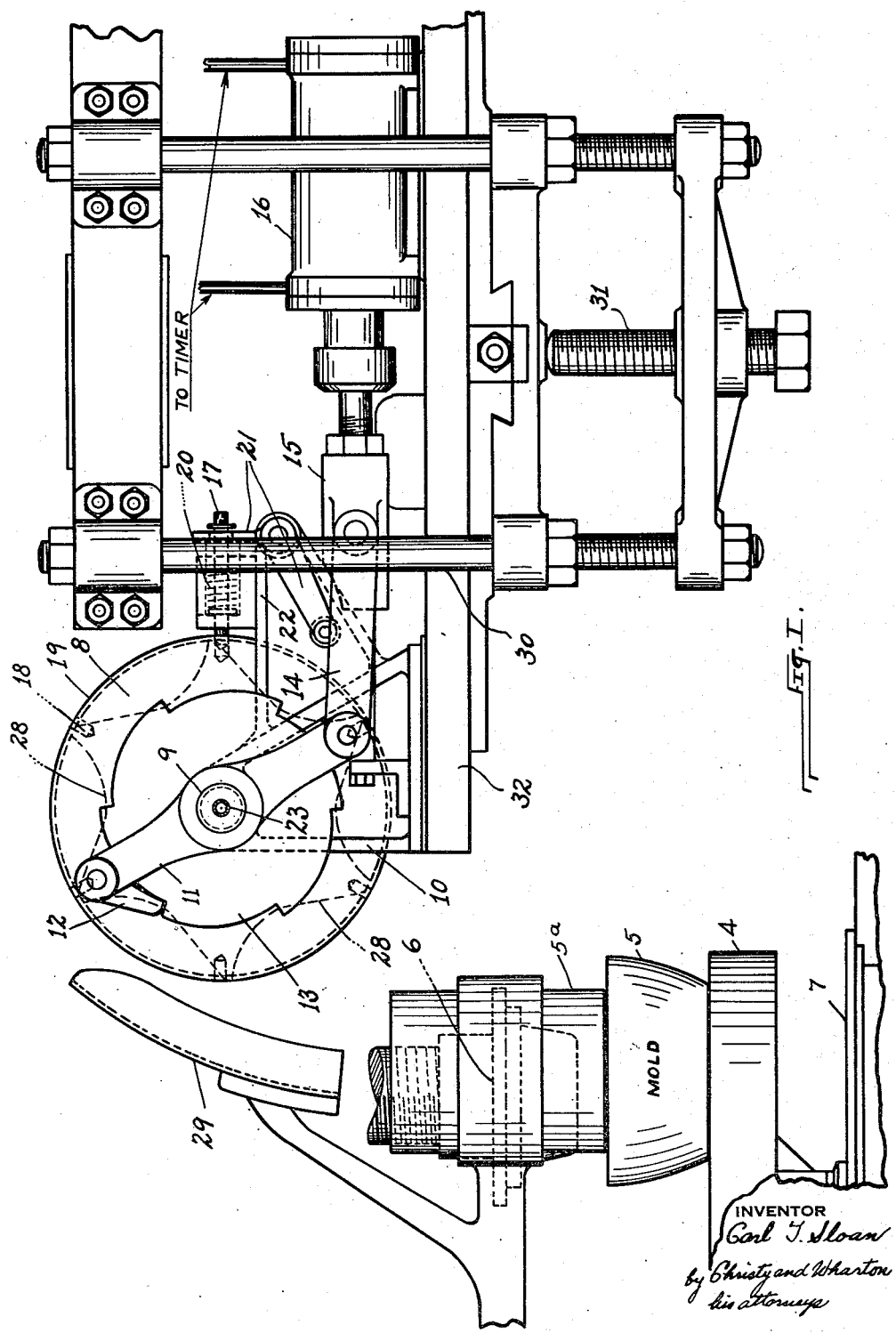
Fig. I.
INVENTOR
Carl T. Sloan
by Christy and Wharton
his attorneys

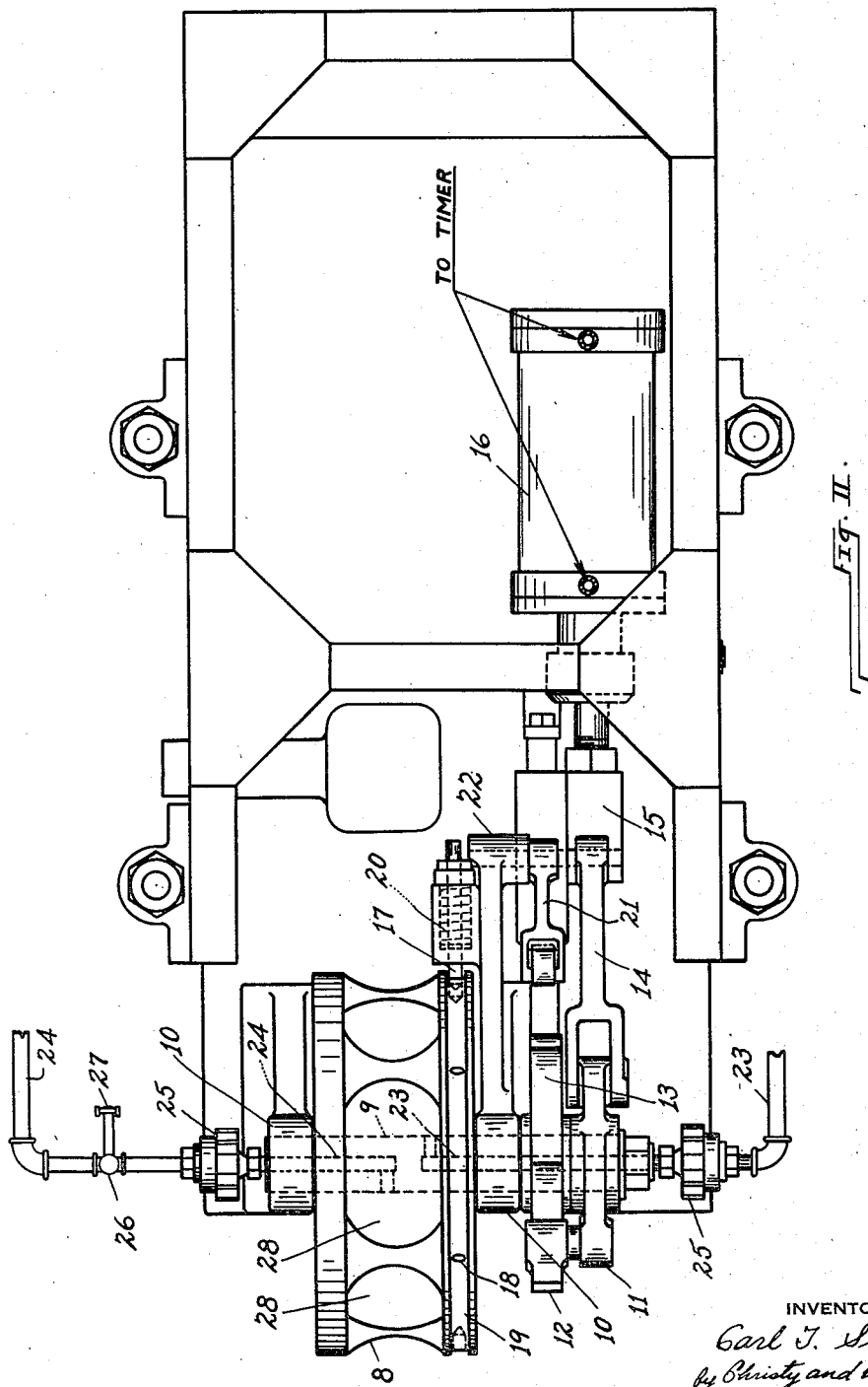

Aug. 25, 1942.  C. T. SLOAN  2,293,860
METHOD OF FEEDING GLASS
Filed March 8, 1940  4 Sheets-Sheet 3
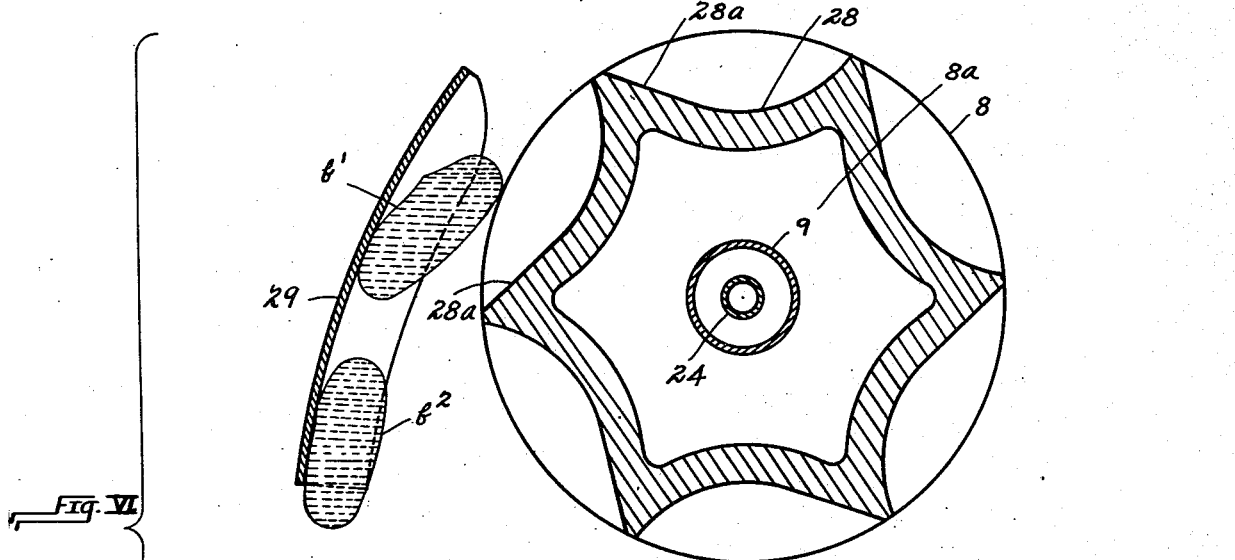
Fig. VI
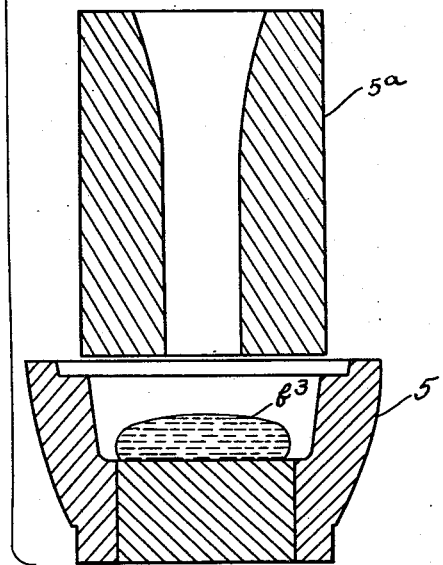
Fig. III.
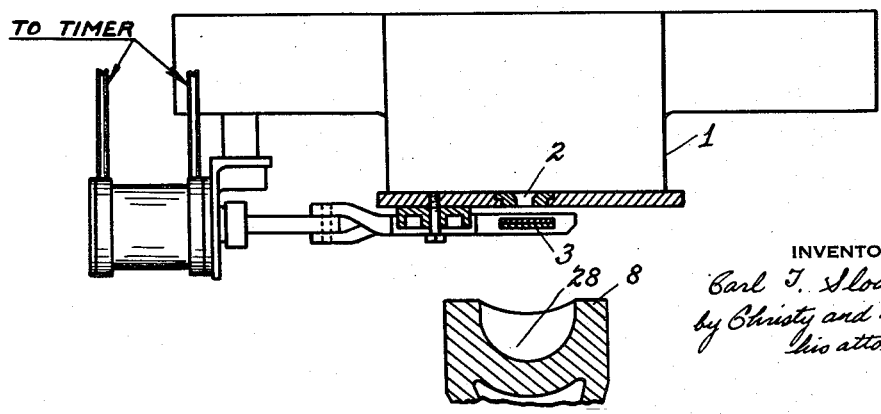
INVENTOR
Carl T. Sloan
by Christy and Wharton
his attorneys

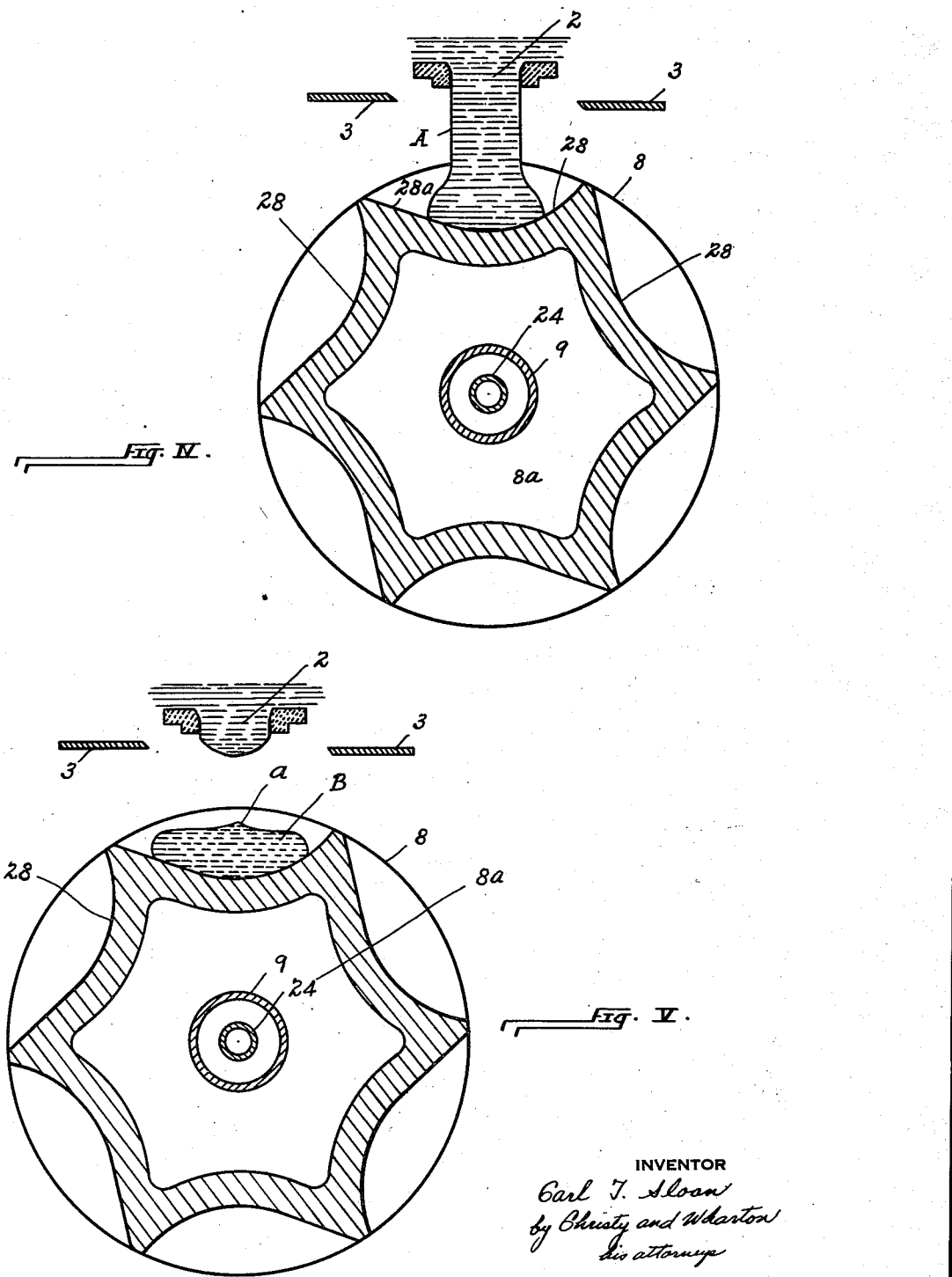

Patented Aug. 25, 1942

2,293,860

UNITED STATES PATENT OFFICE 2,293,860

METHOD OF FEEDING GLASS

Carl T. Sloan, Jeannette, Pa., assignor to The Jeannette Glass Company, a corporation of Pennsylvania Application March 8, 1940, Serial No. 322,942

5 Claims. (Cl. 49—77)

This invention relates to a method of feeding mold charges of glass to a glass-forming machine.

In making glass articles of high quality, such as saucers, dishes, and glass containers in general, in which good appearance and strength are both of importance, mold charges of molten glass from a bulk supply in a melting furnace should be delivered in such condition that the forming operation will produce approximately perfect articles. That is, each mold charge of glass should, as it is delivered to the mold, be of proper, uniform temperature and consistency throughout its entire body.

It is necessary, in order that molded glass articles of perfect appearance be produced, that the mold charge be compact, without any projecting relatively cool regions, and without overlapping in the body of a mold charge. If this condition does not exist, the formed article will show markings. A great cause of marking in formed glass articles is the fact that each mold charge is severed from a bulk supply, or parent body of molten glass and at the point of severance there is a tendency for the severed surface, or a lip formed by the severance, rapidly to chill, and in the formed article to cause an imperfection known as a "shear mark."

Regional inequality in temperature of the mold charge, either as it is delivered to the mold, or as it is caused during the forming steps; will tend to set up undue stresses in the articles formed from the glass. Also by the attenuation of an ordinary "gob," as it is shaped by suspension in a well-known way of delivering mold charges of glass to a forming machine, internal stresses are set up in the shaping.

It is the object of my invention to deliver to the receiver molds of a glass-forming machine mold charges at adequately high temperature, in which the severed surface of each charge is already taken into the body of the charge and equalized in temperature therewith, and in which the contour of the body forming each mold charge is of such regularity that it will tend uniformly to spread in the mold under pressure to form glass articles in which both surface marking and internal stresses are minimized.

In the past there has been a practice in which an outflow of molten glass from a melting furnace has been supported as a column in the receiver mold itself and such column has been severed to form by gravity a uniformly contoured body in the mold; with substantial absorption of the cut surface of the column into the body, and with consequent uniform temperature throughout the entire body. It is, however, impractical in high speed glass-forming machines of the sort universally employed in the art to bring the receiver molds so close to the discharge orifice of the furnace that they may receive and support as a column an outflow of molten glass therefrom. There is difficulty in conveying a mold charge of molten glass, received and severed on a supporting surface, from the furnace adjacent which it is severed to a lower-lying receiver mold, because of the requirement that the body of the mold charge should not in passage be substantially distorted, or any region of it chilled to a temperature substantially lower than the other regions of the body.

This problem I have solved by bringing successive angularly-movable dished projector surfaces close to the discharge orifice of a glass furnace, to support an outflow from the furnace as a column; by severing the column supported on each surface, with reception of the severed end of the column under gravity into the body of the charge as the charge is gathered on the projector surface; and by angularly moving each projector surface when the mold charge has gathered on it, to project the charge outwardly and downwardly to fall by gravity to the receiver mold.

Further, I so regulate, or constrain, the turning movement of the mold charge, as it falls, that the side of the mold charge body which has lain uppermost on the projector surface and which, therefore, includes the cut end of the severed outflow column of glass will be presented at one side of the mold, as the mold charge is delivered in the mold. This additionally tends to merge into the body of the mold charge any irregularity remaining at the cut end of the charge, and by a further regional interchange of substance in the charge tends additionally to equalize temperature throughout its body.

In the accompanying drawings which show exemplary apparatus for conducting my method of feeding mold charges to a glass-forming machine, Fig. I is a side elevation of feeding apparatus for receiving outflow of glass from a furnace and for projecting it to a receiver mold. Fig. II is a plan view of the apparatus shown in Fig. I. Fig. III is a detail elevational view showing a fragmentary element of glass feeding apparatus in proximity to a furnace for supplying molten glass, and showing shears effective between the furnace and the feeding apparatus for severing outflow glass. Fig. IV is a diagrammatic view, showing a rotatable drum, or wheel, forming the main element of the apparatus, and showing an outflow of glass from the discharge orifice in the forehearth of a glass-melting furnace, supported as a column on one of the angularly-movable dished projector surfaces of the said drum, or wheel, prior to severance of the outflow column. Fig. V is a diagrammatic view illustrating the formation of a mold charge by settling or gathering of the severed column of glass on the dished projector surface. Fig. VI is a diagrammatic view illustrating stages in the delivery of the mold charge to the receiver mold, as the charge is projected outwardly and downwardly by angular movement of the projector surface to fall by gravity to the mold.

In the exemplary illustration of feeding and forming apparatus from which, as shown in Figs. I, II and III, structural details have been omitted, there is shown in fragmentary manner the forehearth 1 of a glass-melting furnace, which has in its bottom a bushed outlet orifice 2. Shears 3 of well-known form and of well-known synchronized operating connections (not shown) are mounted adjacent the bushed outlet orifice of the furnace. At a lower level than the furnace there is shown diagrammatically in Fig. I a turn-table 4, carrying a plurality of receiver molds 5, cooperatively mounted in a base 7 with respect to a pressing plunger, which is fragmentarily shown and is designated by reference numeral 6.

In well-known manner the turn-table moves first to present a mold at a feeding station in which it receives a mold charge of glass from the furnace, and then at a pressing station in which the plunger cooperatively entering the mold presses the glass article which is to be made. It is to be understood that movement of the turn-table and plunger, operation of the shears, actuation of the feeding mechanism which is to be described, and operation of any means regulating the outflow of glass from the furnace, is appropriately timed by any of the well-known forms of timing apparatus designed for that purpose.

The primary element of the feeding means is a wheel, or drum, 8 mounted closely adjacent the outlet orifice 2 of the furnace, and adapted to be moved angularly step-by-step. To this end it is carried by a hollow shaft 9 rotatably mounted in bearings 10. Propulsion of the wheel is caused by a rocker arm 11 mounted on an extension of the shaft 9, and carrying a pivoted dog 12 cooperative with a ratchet 13. A link 14 connects rocker arm 11 with the cross-head 15 of a fluid pressure cylinder 16. Rocking motion of rocker arm 11, under the influence of pressure cylinder 16 serves to propel the wheel.

In order to lock the wheel 8 in fixed position between propulsions, a spring-pressed pin 17 is mounted cooperatively with respect to a series of peripherally spaced sockets 18 on a rim 19 of the wheel. As the lower end of rocker arm 11 moves forwardly to retract the pivoted dog 12 and bring it behind a ratchet tooth for the next propulsive movement imparted to the wheel, pin 17 is withdrawn against the resistance of spring 20 by a bell-crank lever 21 pivoted in bracket 22, and acted upon by the cross-head 15 of the pressure cylinder.

As wheel 8 is purposed to receive molten glass from the furnace 1, it is cored, and water circulation through hollow shaft 9, and cavity 8a of the wheel, is provided by water inlet and outlet connections 23 and 24 and fittings 25. A valve 26, to regulate the rapidity and cooling effect of this water circulation, is interposed in the outlet connection 24, and a thermostat to control valve 26, and thus to make the control of the circulation automatic, is shown at 27.

In its propulsion, wheel 8 presents successively beneath the outlet orifice 2 of the furnace dished surfaces 28, which are arranged to dwell in centered position beneath the orifice 2, as they are held by the locking pin 17. As is shown, the dished projector surfaces 28 are relatively shallow, and are smoothly curved in all directions in that region of each which lies directly below the outlet orifice of the furnace. The forward or discharge end 28a of each of the dished surfaces is, however, made to follow a line of but slight curvature, which is tangent to the rearward curvature of the surface. This contouring facilitates discharge of a mold charge from the surface. For a reason which will be explained, I have found it to be of great advantage that the vertical position of the projector surfaces be regulable with respect to the outflow opening of the furnace. Means for effecting such regulation are shown as threaded supporting columns 30 and adjusting screw 31. The conformation of the projector surfaces which I have discovered to be best, and other structural features of the apparatus herein disclosed in exemplary manner, are discussed in detail in my companion application Serial No. 322,941, filed March 8, 1940, for an improvement in Glass feeding apparatus.

In conducting my method, as illustrated more particularly in Figs. IV, V and VI of the drawings, an outflow of molten glass from the furnace is received upon one of the dished projector surfaces 28 as it dwells beneath the orifice 2, and momentarily is supported as a column on that surface. This outflow column, designated A, upon contact with the projector surface, spreads somewhat to follow the dished contour of the surface on which it is supported, and regionally to form itself in accordance with that contour. The outflow column A is then cleanly cut by shears 3 in a region of the column relatively close to the outlet orifice 2. If high fluidity of the glass, or other consideration should render it desirable so to do, outflow of molten glass through the discharge orifice of the furnace, may be slightly intermitted by any agency adapted to that end.

The outflow then upon severance sinks by gravity, so that it gathers a coherent body B on the dished surface. As the coherent gathered body B forms under gravity, the severed end a of the outflow column is received into the remainder of the body, to leave minimized surface irregularity resultant from severance of the column. I prefer that the outflow column A be cut, as shown, without any substantial attenuation in the region of cutting, as I have found that a wide surface is best received into the remainder of the body B, without the formation of a lip or string of glass subject to rapid chilling. This body, or primary mold charge, B, as it forms under gravity after severance, appears in Fig. V of the drawings.

Fig. VI of the drawings shows the body B constituting the mold charge in three different positions, designated $b'$, $b^2$, $b^3$. In the position $b'$ it is shown as projected outwardly and downwardly by angular movement of the projector surface on which it has lain; and in the drawings it is indicated that in its fall under gravity its angular projection gives it a turning movement. A contact surface is presented to the outward movement of the mold charge B by a baffle, or guard, 29 against which the mold charge may impinge, with turning movement, in its fall to the mold.

In falling to the mold, the charge B is desirably passed through a funnel 5a into the position $b^3$ shown in Fig. VI. In its position $b^3$, in which the mold charge B is shown after its reception in the mold, it lies, as shown, with substantially no remaining surface irregularity attributable to its severance. The mold charge body as it strikes the floor of the mold, with the region at which it has been severed presented away from the mold floor, finally merges into its still highly heated substance any irregularity due to its severance which has persisted up to that stage. In the event that outward projection of the mold charge brings it into contact with the surface of baffle 29, turning movement of the body is so constrained by such surface as to insure delivery of the mold charge into the mold with the severed side at one side of the mold. This contact, being merely a wiping contact, is not of a sort to impede the free fall of the body.

Thus the mold charge, by its formation as a coherent body under gravity upon severance of the supported outflow column of which it is composed, initially receives a smooth and regular contour from the dished projector surface on which it forms, and this regularity of contour and initial smoothness of surface are retained and improved by the projection of the mold charge and its delivery in the mold. There is in pursuing my method a double opportunity for equalization of temperature in the mold charge, and for absorption of surface protrusions into the body of the mold charge. Primarily, the charge attains form and cohesion on the projector surface to which it sinks by gravity after the column of which it is composed has been severed. The secondary, and similar, effect takes place in the receiver mold by delivery of the mold charge severed-side-up therein.

It may be explained that it is possible by my method to deliver the mold charges to molds at an optimum temperature for pressing, or other forming operation. That is, the contacts of the mold charge, from its issuance as an outflow from the furnace to its delivery to the receiver mold, are such that it is reduced in temperature only enough to increase its coherence and improve its moldability, and there is no substantial regional chilling, or skin-chilling, of the mold charge body in its formation or delivery. For example, if we assume that the outflow from the furnace is at a temperature of about 2400° F., I can deliver the mold charge to the mold at a temperature of from 2000° F. to 2100°, approximately uniform throughout the body of the mold charge.

In this connection it may be noted that any contact of a mold charge with the surface of the baffle is so fleeting, that contact with it exerts no substantial heat-abstracting effect on the surfaces of the mold charges which contact it. Also, by regulation of water circulation through the wheel carrying the projector surfaces on which the mold charges are formed, the temperature of those surfaces may be maintained just below that at which the glass will tend to adhere to the surface, thus to minimize tendency toward skin-chilling of the mold charges on the projector surfaces upon which they are formed and from which they are projected.

It is an important feature of my invention that it is consistent with, and inherently includes accommodation to weight change of the mold charges, and change in the temperature of the glass as it flows from the furnace. To explain: the feeding cycle may be taken as defined by each progressive movement of the projector and the dwell of a projector surface between progressive impulses of the projector. If it becomes desirable to increase the weight of the mold charges, the vertical distance between the outlet orifice and the projector surface is increased, the dwell of the projector surface beneath the orifice is increased adequately to provide for collection of the mold charge, the action of the shears takes place at longer intervals. If it is desired to decrease the weight of the mold charges, the vertical distance between the outlet orifice and the projector surface is decreased, the action of the shears takes place at shorter intervals, and the dwell of the projector surface may optionally be decreased or maintained, as it may seem desirable to hold the mold charge a shorter or longer time on the projector surface.

In accommodation to changes in the temperature of the glass, the vertical distance is made shorter, the action of the shears more rapid, and the dwell of the projector may within limits be optional to hold the mold charge on the surface a longer or shorter time. If the glass be cooler, the vertical distance is made greater, and the cycle is made longer by a longer interval between shear action and a longer dwell of each projector surface beneath the outlet orifice, in order adequately to provide for the collection of the mold charge.

All these accommodations occur without changing bushings at the outlet orifice of the furnace, and may in some instances take place without changing the forming cycle in which delivered mold charges are formed into glass articles.

It should be explained that the vertical adjustment of the projector, and its glass-supporting surfaces, in these accommodations preserves under the variant conditions of operation the smooth surface and the regular contour of the mold charge body.

Thus, if the temperature of the glass be particularly high, there is a tendency for the outflow stream to twist, or wave, in passage to the receiver surface of the projector, causing a lapping in the body. That tendency is forestalled by decreasing the vertical distance between the outflow orifice and the receiver surface of the projector, decreasing the height of the outflow column.

Conversely, if the glass be cool, and the projector surface be too close to the outflow orifice, there is a tendency for the glass to be forced down upon the projector surface by its own body, thus causing a wave effect which may be so folded in, or otherwise persist in the body, that it prevents perfection in the formed article. That tendency is forestalled by increasing the vertical distance between the outflow orifice and the projector surface, and thereby increasing the height of the outflow column, so that the spread of the glass on the surface is lessened pending severance of the outflow column.

In making accommodation to change in the weight of the mold charges (assuming that the temperature of the glass is not changed) adjustment away from the outflow orifice prevents distortion due to excessive spreading pending severance, if the weight of the mold charges is increased. Adjustment toward the outflow orifice insures that the outflow is in contact with the projector surface when severed, if the weight of the mold charges is decreased. Under such circumstances also the adjustment tends toward perfection in the mold charges and in glass articles formed from them.

Whereas the above description of the stages of my method may make it appear to be relatively slow, it is in fact rapid. In practicing it, I have been able to conduct a long-continued operation at a rate of about forty formed glass articles per minute. When in conducting my method the apparatus elements contacting the glass have been brought to a good operating temperature, the glass articles produced by continued operation are free of shear marks.

It is to be understood that many changes from the exemplary apparatus herein disclosed, and various modifications in the disclosed steps of my method, may be made without departing from the patentable concept of my invention.

I claim as my invention:

1. The herein described method of feeding a charge of molten glass from a bulk supply to a lower-lying receiver mold by supporting an outflow column of glass upon an angularly movable dished projector surface, severing the said outflow column from the bulk supply with formation under gravity of a coherent mold charge upon the said projector surface, controlling the form of the mold charge gathered on the projector surface after severance of the said outflow column of glass by adjusting the height of the said column to the fluidity of the glass of which it is comprised and the desired weight of the mold charge, and after severance of the said column and formation of the coherent mold charge projecting the mold charge outwardly and downwardly (by angular movement of the said projector surface) to fall by gravity to the said receiver molds.

2. The herein described method of feeding a charge of molten glass from a bulk supply to a lower-lying receiver mold by supporting an outflow column of molten glass upon an angularly-movable dished projector surface, severing the said outflow column with formation under gravity of a coherent mold charge upon the said dished projector surface and with substantial reception of the severed surface of the column into the body of the said mold charge, controlling the form of the said mold charge body on the said projector surface by shortening and lengthening the said outflow column in accordance with higher and lower temperature of the glass of which it is composed, and after severance of the said column and formation of the coherent mold charge projecting the mold charge outwardly and downwardly (by angular movement of the said projector surface) to fall by gravity to the said receiver mold.

3. The herein described method of feeding a charge of molten glass from a bulk supply to a lower-lying receiver mold by supporting an outflow column of molten glass upon an angularly-movable dished projector surface, cooling the said surface regulably to a temperature just below that at which the outflow will tend to adhere thereto, severing the said outflow column with formation under gravity of a coherent mold charge upon the said dished projector surface and with substantial reception of the severed surface of the column into the body of the said mold charge, controlling the form of the said mold charge body on the projector surface by shortening and lengthening the said outflow columns in accordance with higher and lower temperature of the glass of which it is composed, and after severance of the said column and formation of the coherent mold charge projecting the mold charge outwardly and downwardly (by angular movement of the said projector surface) to fall by gravity to the said receiver mold.

4. The herein described method of feeding a charge of molten glass from a bulk supply to a lower-lying receiver mold by supporting an outflow column of molten glass upon an angularly-movable dished projector surface, severing the said outflow column in a substantially unattenuated region thereof with formation under gravity of a coherent mold charge upon the said dished projector surface and with substantial reception of the severed surface of the column into the body of the said mold charge, controlling the form of the mold charge gathered on the projector surface after severance of the said outflow column of glass by adjusting the height of the said column to the fluidity of the glass of which it is composed and the desired weight of the mold charge, and after severance of the said column and formation of the coherent mold charge projecting the mold charge outwardly and downwardly (by angular movement of the said projector surface) to fall by gravity to the said receiver mold.

5. The herein described method of feeding a charge of molten glass from a bulk supply to a lower-lying receiver mold by supporting an outflow column of molten glass upon an angularly-movable dished projector surface, cooling the said surface regulably to a temperature just below that at which the outflow will tend to adhere thereto, severing the said outflow column in a substantially unattenuated region thereof with formation under gravity of a coherent mold charge upon the said dished projector surface and with substantial reception of the severed surface of the column into the body of the said mold charge, controlling the form of the mold charge gathered on the projector surface after severance of the said outflow column of glass by adjusting the height of the said column to the fluidity of the glass of which it is composed and the desired weight of the mold charge, and after severance of the said column and formation of the coherent mold charge projecting the mold charge outwardly and downwardly (by angular movement of the said projector surface) to fall by gravity to the said receiver mold.

CARL T. SLOAN.